United States Patent [19]

Dailey et al.

[11] Patent Number: 4,488,079
[45] Date of Patent: Dec. 11, 1984

[54] DYNAMOELECTRIC MACHINE WITH STATOR COIL END TURN SUPPORT SYSTEM

[75] Inventors: George F. Dailey; Homer W. Luzader, both of Plum, Pa.

[73] Assignee: Westinghouse Electric Corp., Pittsburgh, Pa.

[21] Appl. No.: 595,025

[22] Filed: Mar. 30, 1984

[51] Int. Cl.³ .............................................. H02K 3/46
[52] U.S. Cl. .................................................. 310/260
[58] Field of Search .............. 310/260, 270, 254, 271; 336/197

[56] References Cited

U.S. PATENT DOCUMENTS

| Re. 28,478 | 7/1975 | Bahn et al. | |
|---|---|---|---|
| 3,975,655 | 8/1976 | Beerman et al. | |
| 4,126,799 | 11/1978 | Iogansen et al. | |
| 4,238,339 | 12/1980 | Khutoretsky et al. | |
| 4,318,021 | 3/1982 | Johansson et al. | 310/260 |
| 4,379,243 | 4/1983 | Dailey et al. | |
| 4,387,317 | 6/1983 | Alkire et al. | 310/260 |
| 4,415,825 | 11/1983 | Dailey et al. | 310/260 X |

Primary Examiner—Mark O. Budd
Attorney, Agent, or Firm—G. H. Telfer

[57] ABSTRACT

A large turbine generator is provided with a stator end winding assembly that includes a large conical member outside the coils which is joined by banding with adjusting rings radially inside the coils, with an adjusting means for each banding location that includes a wedge extending through an aperture in a portion of the adjusting ring that extends away from the coil and having a fastener that is joined to the wedge so that upon the tightening of the fastener, the wedge will be forced in the axial direction bearing against the banding and hence tightening it; and in addition, the conical member is provided with projections serving as torque splines that fit within apertures of the core so as to prevent its rotational movement in operation.

3 Claims, 3 Drawing Figures

DYNAMOELECTRIC MACHINE WITH STATOR COIL END TURN SUPPORT SYSTEM

BACKGROUND AND SUMMARY OF THE INVENTION

This invention relates to dynamoelectric machines such as large turbine generators and particularly to the stator coil end turn support systems thereof.

The description contained in Dailey et al. U.S. Pat. No. 4,379,243, Apr. 5, 1983, is herein incorporated by reference. The patent discloses an end turn support structure that has a conical member located radially outside the end turns. It provides a support structure that has thermal expansion characteristics so it expands in a manner similar to the end turns which it supports. In structures so made, the conical member and a top and a bottom coil of an end turn are secured together by bolts or studs extending from the outside of the conical member through a support ring that is located inside the top coils of the end turns. The stud necessarily passes adjacent to the top and bottom coils. As thus arranged, the original manufactured assembly can be made quite secure but a need exists to make sure the assembly is not only secure and able to withstand the forces to which it is subjected in operation as originally manufactured, but also that there is a way to easily adjust the tightness of the assembly after a period of operation, while it remains in the field, in order to account for creep and shrinkage of the insulation materials employed in the assembly. A degree of adjustability of the prior structure is attained by the threaded stud but such an element requires a clearance substantially beyond that of the top and bottom coils themselves. Its use is limited to the portion of the end turn proximate its axial extremity because the inboard region of the end turn has limited space between it and the rotor. Thus, the extending stud would either be totally unusable or would be so limited in its access that it could not be retightened in the field while the rotor of the machine is in place.

The present invention has primarily to do with making a secure end turn support region which allows greater support of the coils by a conical support member while also permitting greater facility of adjusting the tightness of such a support over the entire end turn length. The invention also has to do with a structural arrangement for insuring the conical support member against rotation forces.

In order to tighten the coils to the conical support member, the present invention utilizes a system of radial banding. The radial banding is applied at one or more spaced locations along the axial length of the end turn. It may be used in addition to the former threaded stud assembly of an inner support ring and the conical member which is located proximate the axial extremity of the end turn. In a particular embodiment, such a threaded stud is employed near the axial extreme of the end turn and at two spaced locations along the end turn closer to the core of the machine there is applied the radial banding of the coils and the conical member.

The radial banding is substantially a banding of a high strength material such as a glass fiber reinforced, resin impregnated banding material, which encompasses the top and bottom coils at a particular end turn location and also passes through apertures in the conical support member. Additionally, however, there is provided means for the adjustment of the banding tightness. This comprises, in a specific embodiment, an adjusting ring that is located radially within the top coils at the banding location. The adjusting ring has a surface that fits against the top coil surface and it also has a portion that projects away from the top coil. The portion projecting away from the top coil has an aperture therein through which is fit a fastener secured to a wedge that conformably fits on top of the portion of the adjusting ring against the coil. The wedge also has a banding block located on its surface away from the coil and it is on the banding block itself that the banding material is applied in assembly. The wedge disposed between the adjusting ring and the banding block permits tightening of the banding during initial assembly as well as in the field in operation. The fastener to which the wedge is attached is threaded on its axially outer portion. A nut on the threaded fastener can be reached, even if the rotor is in place, to draw the wedge axially outward, forcing the banding material to tighten against the banding block. The assembly may include a plurality of disc-shaped spring washers to help insure the fastener remains tight.

The advantages of this arrangement include easy adjustability in the field as well as during original manufacture, the adjusting nut on the fastener of the adjusting device is accessible from the axial extreme of the machine, the adjusting device has a relatively low profile so that it fits readily within the space available between the top coil and the rotor structure, and the adjusting ring also provides a way to compress the structure before the hoses are pressurized that extend between the top and bottom coils of the end turns.

Another aspect of the invention is that the conical support element is configured with projections on its axial inmost extreme and such projections fit within apertures provided in the core so that the cone is not susceptible to rotation during operation.

DESCRIPTION OF THE PREFERRED EMBODIMENTS

Figure 1:
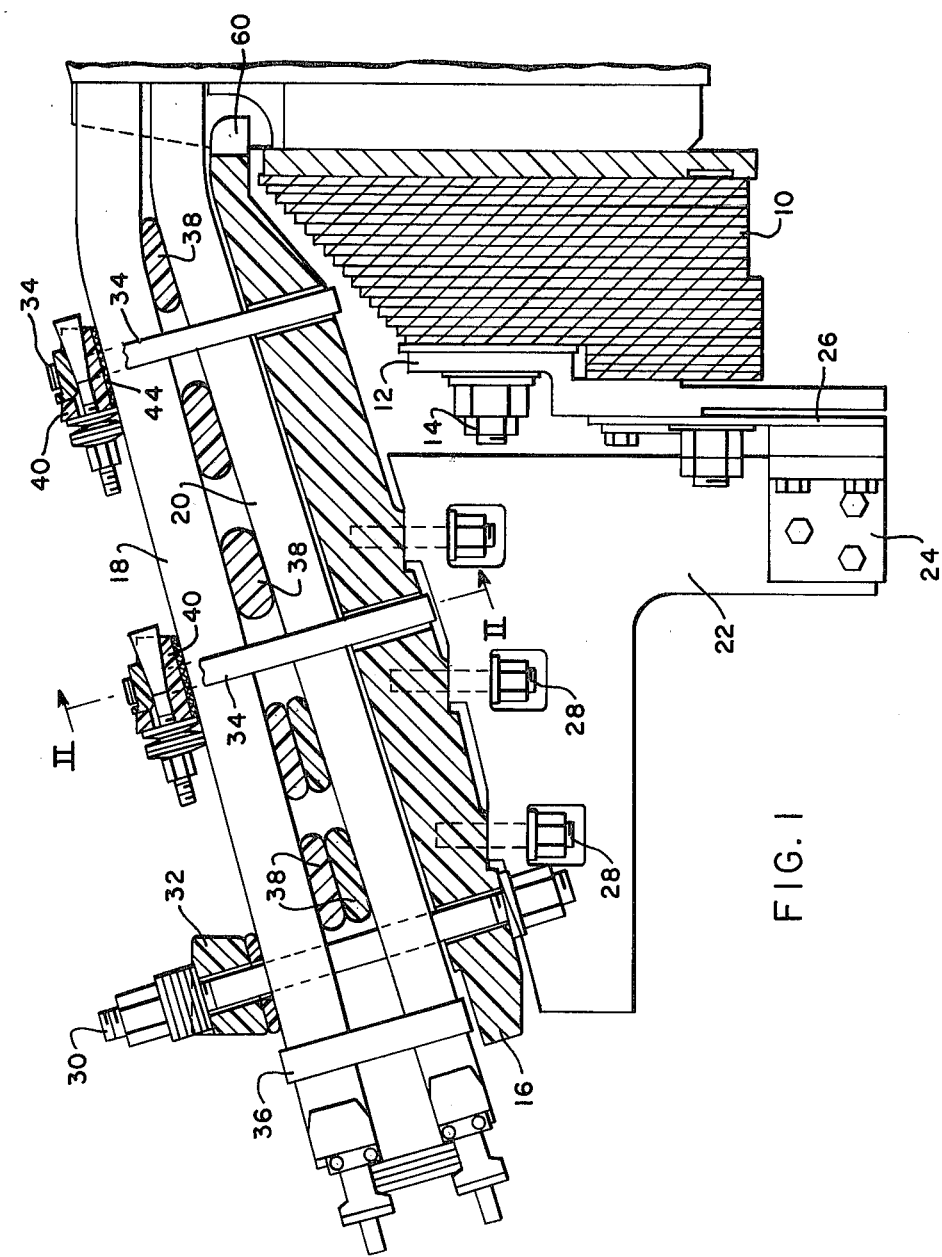
FIG. 1 is a partial sectional side view of an end turn portion of a dynamoelectric machine showing an embodiment of the present invention.

A stator assembly as shown in FIG. 1 has a core 10 of a large number of thin laminations of magnetic core material clamped together between core support plates 12 by bolts 14. The end winding bracing structure includes a conical member 16 encircling stator coils including a top coil 18 and a bottom coil 20 extending from each slot within the core 10 and bearing radially outward. There are also radially extending, circumferentially spaced braces 22 supported by coil brace brackets 24 and flex springs 26 in relation to the core.

The brace 22 and conical member 16 are joined by threaded glass studs 28 that are assembled in holes tapped directly into the large cone 16.

There is a threaded stud 30 extending through the cone 16 and through an inner support ring 32 located inside the top coil 18. The tigthening of this threaded stud 30 substantially secures the conical member 16 and the top and bottom coils 18 and 20 of the end turn at that location. There is, however, additional means for securing the conical member 16 to the top and bottom coils 18 and 20 of each end turn along their length and this is provided by the radial banding 34 as shown.

The radial banding 34 principally discussed herein may be in addition to banding 36 that is applied to join the top and bottom coils themselves or banding (not shown) that secures the conical member 16 and the bottom coil 20.

As shown in the drawing there is located between the top and bottom coils 18 and 20 a plurality of conforming reinforced support hoses 38 as have been used heretofore. These hoses are inserted within the winding assembly and then filled under pressure with a resin which when cured conforms to the configuration of the end turns. One of the problems which the present invention addresses is that such material, as well as other portions of the support structure, tend to change dimensions due to creep and shrinkage so that after a period of time in operation they are no longer secure.

The radial banding 34 securing the conical element 16 and the top and bottom coils 18 and 20 is applied over an adjusting ring 40 that is located radially within the top coil 18. The adjusting ring 40 is an arcuate element that encompasses a plurality of end windings. A circular ring, divided into four segments, of a fiber reinforced epoxy material is suitable for the ring. The ring 40 has a portion 42 bearing against the top coil 18 (preferably with a piece of conforming rope 44 therebetween as shown in FIG. 2) as well as a portion 46 extending away from the top coil, the latter portion 46 having an aperture 48 therein (see FIG. 3).

Figure 2:
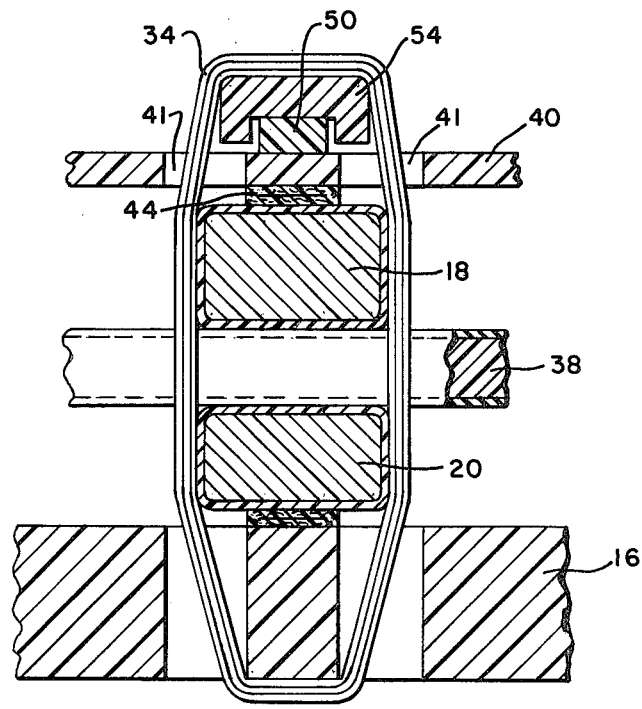
FIG. 2 is a sectional view taken along the line II—II of FIG. 1.
Figure 3:
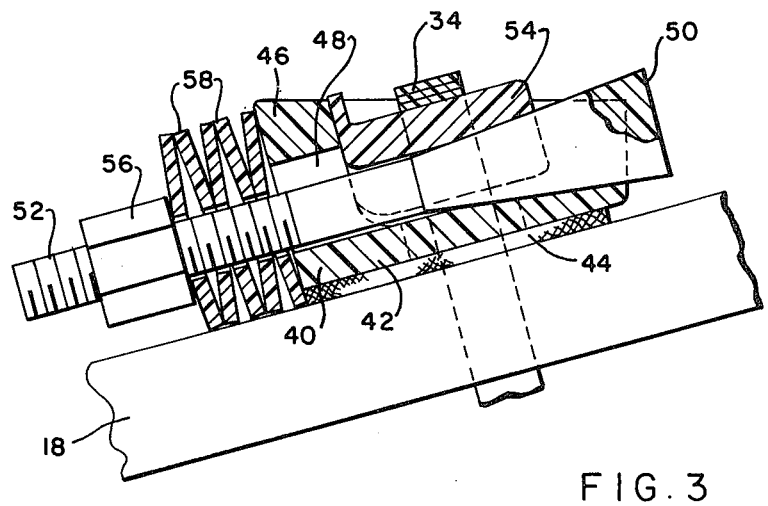
FIG. 3 is a more detailed view of a banding adjusting device employed in the embodiment of FIGS. 1 and 2.

The section view of FIG. 2 illustrates the top and bottom coils 18 and 20 and their relation with the cone 16, the adjusting ring 40 and the banding 34, the banding passing through apertures in the cone 16 and gaps or holes 41 in the ring 40. FIG. 3 shows an enlarged view of the adjusting device.

What is of particular import is the adjustability feature provided by the device on the surface of the top coil 18 comprising the adjusting ring 40 and the related elements. A wedge 50 which is movable in relation to the adjusting ring 40 is located as shown with its thinner dimension disposed directly under the location of the banding 34 and its thicker dimension axially inward therefrom. The ring portion 42 and the wedge 50 have tapered mating surfaces of relatively smooth low friction material permitting sliding engagement therebetween. The wedge 50 is attached to a threaded fastener stud 52 that extends through the aperture 48 in the portion 46 of the adjusting ring 40 that extends away from the coil 18. In addition, there is a banding block 54 located on the radial inside of the wedge 50 and it is directly to this element that the banding 34 is applied, as shown in the cross section of FIG. 2.

In assembly, the ring 40 is put in place, the adjusting wedge 50 is put in place, the banding 34 is applied and cured, then the reinforced hoses 38 are pressurized and the result is a very tight and secure assembly. In the course of operation or with age, as the dimensions of the elements change, the need for adjustability is satisfied by the wedge-type adjusting element 50 located for each band 34. As shown in the figure there is a threaded nut 56 that is secured to the stud 52 that is passing through the aperture 48 in the adjusting ring and joined with the wedge 50. The tightening of the nut 56 on this stud 52 draws the wedge 50 axially outward so that it forces the banding block 54 away from the coil and hence tightens the banding 34. Spring washers 58 are preferably located on the stud 52 inside the nut 56.

The banding 34, ring 40, rope 44, wedge 50, stud 52, block 54, nut 56 and washers 58 are all preferably of insulating material such as of a glass fiber reinforced composite.

The virtues of this arrangement are that the adjustment can be performed readily in the field, as well as in the shop, because of easy access to the nut 56 on the adjusting device. Thus, the banding 34 and its adjusting ring 40 is inherently capable of being employed in axially inner regions of the end turn as opposed to the threaded stud arrangement which is essentially limited to the axial outmost portions.

The structure in FIG. 1 is representative of, for example, a large turbine generator with a water cooled stator winding. One aspect that can be varied from the illustration is to have the axially inward portion of the cone 16 shaped to accommodate the location of bolts such as 14 that hold the core 10 together. That is, moving the bolts 14 closer to the inside portion of the core, where the coil slots are, is desirable.

The illustration of FIG. 1 is one that is sufficient to show those skilled in the art the nature of the end turn support system incorporating the invention. It is to be understood that the figure simplifies the actual structure because of the well-known and widely-used involute configuration of stator end turns. Each end turn coil takes a circumferential arcuate path that would be out of the plane of FIG. 1. The banding 34 would normally be applied at the crossover of a top coil and a bottom coil that are not parallel and do not extend from the same core slot.

Another aspect of the structure is that illustrated in FIG. 1 wherein the conical member 16 has one or more projections 60 that extend within a notch in the core 10 or its finger plate. These projections 60 act as torque splines for the purpose of securing the conical element 16 against rotational forces as it is subjected to in operation.

Consequently, the present invention provides a more secure end winding assembly as well as a more readily adjustable end winding assembly than has been heretofore provided. Various modifications to the combination may be made to the arrangement as specifically described herein.

We claim:

1. A stator coil end turn support system comprising in combination:
   stator coil end turns including a top coil and a bottom coil extending axially from slots in a stator core with extremities of said end turns radially outward from said slots;
   a conical support member containing said end turns therein and configured to fit closely adjacent and radially outside said bottom coils;
   means for securely fastening one of said top coils and one of said bottom coils together with said conical support member comprising banding, at at least one location intermediate the length of an end turn, extending through apertures in said conical support member and around both said top and bottom coils;
   said banding passing over a banding adjustment means on the inner surface of said end turns, said banding adjustment device permitting tightening of said banding in both original manufacture and in field operation and comprising an adjusting ring fitting under the top coil of said end turn and having a portion extending away from said top coil with an aperture in said extending portion, a wedge extending through said aperture with a fastener thereon, a banding block on the side of said wedge away from said top coil, said banding being located on a surface of said banding block away from said coil and fastener means for drawing said wedge into said aperture of said adjusting ring extending portion to tighten said banding.

2. A stator coil end turn support system in accordance with claim 1 wherein: said adjusting ring and said wedge have tapered mating surfaces permitting sliding engagement therebetween.

3. A stator coil end turn support system in accordance with claim 1 wherein: said conical support member has projections thereon extending within notches in said core and serving as torque splines preventing rotation of said conical support member in operation.

* * * * *